Patented Dec. 13, 1938

2,139,864

UNITED STATES PATENT OFFICE 2,139,864

TREATMENT OF OITICICA OIL

John P. Stancil, Pine Lawn, Mo.

No Drawing. Application January 20, 1936,
Serial No. 59,910

1 Claim. (Cl. 260—424)

This invention relates generally to the treatment of oiticica oil and particularly to the manufacture of driers from oiticica.

Oiticica oil is derived from the fruit or nut of the oiticica tree (botanically termed *Licania rigida*, Benth. but commonly known in the United States as *Conepia grandiflora*, fam. Rosasae) which is indigenous to Brazil and found in enormous quantities in the various States of Brazil. The oil is recovered by the expression or extraction from the nuts either hot or cold, and is recovered in a liquid condition of a pale golden or greenish white color. Upon standing for a period of time under normal conditions of temperature, the oil changes from the liquid state to that of a solid.

Prior investigators of oiticica oil have agreed that the crude oiticica oil is an eutectic mixture composed of a fatty portion which will be termed herein as the "steariform part" and a liquid portion having a lower melting point than the steariform part and which will be termed herein as the "oleiform part". In the fresh crude oil at a given temperature the steariform part may be solid, while the oleiform part remains liquid, upon standing the oleiform part will also have become solid, or rather it may be said that the oleiform part will have come thoroughly mixed with the steariform part in such a manner that a given body of oil will have the appearance of a solid in time. The prior investigators of oiticica oil have concluded that the steariform part predominates in the oiticica oil, but investigations leading to the present invention have shown that to be untrue.

Oiticica oil is classified as a drying oil and indeed its drying properties are superior to that of any other known oil. Efforts have been made to use oiticica oil as a paint vehicle by thinning either the crude or processed oiticica oil with a suitable thinner such as kerosene or other thinners native to Brazil. The use of oiticica oil as a paint vehicle has met with disfavor principally due to the fact that the paint films resulting are of a wrinkly structure. This is possibly due to the fact that the oil dries too rapidly, so rapidly in fact that the portions beneath the surface do not harden but remain soft and porous so that such paint films may be readily scraped off with the finger nail and show indentations when pressure is applied. Although after long periods of time, the paint film appears to harden sufficiently that it is no longer soft and porous, it is then brittle or crackly and may be readily peeled off.

The object of the present invention, generally stated, is to provide a treatment for oiticica oil whereby the product resulting may be used either alone or with other drying or semi-drying oils without encountering the disadvantages enumerated above.

A further object of this invention is to recover the active drying constituent from oiticica oil.

Another object of this invention is to provide a treatment of oiticica oil whereby the steariform part is completely removed from the oleiform part.

Other objects will become apparent to those skilled in the art when the following description is read.

In accordance with the present invention oiticica oil is treated so as to separate the steariform part from the oleiform part. After this separation is accomplished, the oleiform part may be used as any other drying oil, as in a paint vehicle or for the making of polymerization products. In the case of use as a paint vehicle, it is necessary either to thin the resulting oil or to further process the oil in order to reduce its viscosity. The oleiform portion may, however, be used with great advantage as a drier to be incorporated in other drying or semi-drying oils, such as linseed oil, soy bean oil, perilla oil, menhaden oil, tung oil and others, for improving the drying properties of those oils.

The oleiform part of the separated oiticica oil may be further processed after separation in order to improve the properties which particularly adapt it for use as a drier. This is accomplished by partial polymerization, as by heating of the oleiform portion.

The steariform part after being separated from the oleiform part is suitable for various uses to which vegetable fats are ordinarily put, as for instance, in the manufacture of soap, fatty acids, etc.

The separation of the steariform from the oleiform portions of oiticica oil may for example be accomplished by natural segregation of these constituents under controlled conditions. For instance, the segregation may be accomplished by treating crude oiticica oil which may advantageously be chilled to solidify it, if not already solid, before being further treated. Depending upon the purity of the crude oil temperatures of 70° F. or therebelow will accomplish the desired solidification. Having the oiticica in solid condition it may be heated until it is completely molten. This will take place, depending upon the purity, at 104–122° F. After the crude oiticica oil has been elevated to a temperature sufficiently high that it is completely molten, the oil may be maintained quiescent and permitted to cool gradually to a temperature at which the steariform part will begin to segregate from the oleiform part. This will occur ordinarily at a temperature at from 74–76° F. If care is taken to cool the oil gradually and to maintain it quiescent during the cooling period and during the period which it is maintained at the low temperature, the steariform part will segregate from the oleiform part showing itself in the form of acicular white bodies. If the oil remains quiescent these white bodies will settle naturally to the bottom of the container. The oil may be permitted to stand quiescent for a time sufficient to permit these white bodies to settle into as solid a mass as possible at the bottom of the container so that the minimum amount of oleiform constituent is intermingled with the solid mass. This may require from five to ten days depending upon the content of foreign matter in the original oil and dependent upon the methods of originally recovering the oil, that is, whether by expression and/or extraction, greater time being required the larger the content of the foreign matter, and greater time being required when the oil is recovered by extracting than when it is recovered by expression on account of unremoved solvents therein.

After the white bodies have settled to the bottom of the container the steariform portion will have become a solid amorphous, greasy body and above that will be a supernatant liquid composed of the oleiform portion of the oil, which will ordinarily constitute about eighty percent of the total volume. In accordance with the present invention, therefore, while the temperature is maintained substantially constant, for example, at about 74–76° F. segregation of the white bodies proceeds until no further segregation takes place, whereupon after the white bodies have settled to the bottom no further changes in the oleiform portions of the oil will occur and it can be held without change indefinitely. Thereafter the temperature of the supernatant liquid oleiform portion may be reduced as low as 70° F. without becoming solid again.

The supernatant oleiform portions may now be separated from the settled steariform portions in any suitable manner. For instance, the steariform portion which has settled to the bottom of the container may be locally subjected to a low temperature, such for instance, as 50° F. which hardens the steariform part to such an extent that it cannot flow. While the solid portion is maintained at this low temperature the supernatant liquid oleiform portion may be removed by decanting, syphoning, pumping or otherwise.

The settled white mass in the bottom of the container will have entrained therein a small amount of the oleiform portion of the oil and this may be removed, if desired. For instance, the temperature of the settled portion may be permitted to rise to the melting point of the oleiform portion which, as remarked above, will be about 70° F. At this temperature the mass may be centrifuged in order to recover the remaining oleiform part of the oil.

The separation may also be facilitated by the use of a flocculating agent capable of flocculating the steariform part such as hydrochloric acid, potassium dichromate, potassium permanganate, and other oxidizing agents whose reaction products may readily be removed from the oil. For instance, hydrochloric acid in an amount corresponding to about 1% of the weight of the oil may be added. For the purpose of dispersing the hydrochloric acid in the oil the acid may be dissolved in a convenient amount of methyl alcohol, as for instance, in the ratio of one pound of acid to two gallons of alcohol. This treatment turns the steariform portion into a semigelatinous mass which is not again miscible with the oleiform portion except under high temperature or extreme agitation, and even if such agitation takes place, the two components will again promptly separate. The action of the flocculating agent would, therefore, appear to such as to modify the surfaces of the particles of the steariform part so that they are not readily wetted by the oleiform part. When hydrochloric acid is used as the flocculating agent, it apparently has the further effect of oxidizing the organic impurities in the oil causing them to accumulate at the bottom.

When such a flocculating agent is used the oleiform part may be directly decanted, pumped or syphoned from the presence of the steariform part without substantial loss of the oleiform part in the interstices of the steariform part and consequently the centrifuging operation, above mentioned, may be eliminated. The flocculating agent may be used either to facilitate removing the entrained oleiform part from the segregated steariform part as an alternative to centrifuging; or, may be applied to the oil before segregation is complete but in the latter case the flocculating agent should not be added until after segregation has commenced.

After the oleiform part is thus recovered the acid may be neutralized with a suitable amount of an alkaline solution, the amount being determined by experiment or experience depending upon the amount of acid remaining in the oleiform portion. Thereafter the oil may be washed with water to remove the traces of the chemicals and impurities in the oil including the alcohol employed in connection with the flocculating agent.

After the oil has been destearinated by separation of the steariform part from the oleiform part, as above described, the oleiform portion will ordinarily be of a pale yellow color and of a slightly lower viscosity than that of the original crude oil.

It will be understood, of course, that many other methods of actually separating the segregated steariform portion from the oleiform portion will present themselves to those skilled in the art, and this invention is not to be limited to the methods specifically referred to for that purpose.

The destearinated oiticica oil thus recovered may be incorporated with other drying or semi-drying oils for use, or it may be thinned with a suitable thinner, such as kerosene or turpentine, if used as a paint vehicle. In fact the destearinated oiticica oil may be further processed in any suitable manner to reduce its viscosity and be used alone for a paint vehicle. For instance, a destearinated oil may be aerated by blowing air through it while it is maintained at a temperature of about 212–350° F. for a period of about ten minutes. Such a treatment reduces the viscosity of the destearinated oil to an extent such that it may be used as a paint vehicle without dilution. When, however, it is desired to use the destearinated oil for polymerization products such as linoleum, this treatment is ot necessary.

When the destearinated oil is mixed with other drying or semi-drying oils, such for instance as, those used for paint vehicles, the drying properties of the paint are improved but in order to further bring out the drying properties of the destearinated oiticica oil, whether for the use in the manufacture of polymerization products or for use as a drier with other vegetable and animal oils having drying properties, the destearinated oiticica oil may be further processed in order to accomplish partial polymerization thereof. This may be accomplished by heating the destearinated oiticica oil to a higher temperature such for instance as up to 572° F. or to lower temperatures for longer periods.

For example, an efficient drier for use with such oils as soy bean, linseed, menhaden, etc. may be produced by heating the destearinated oiticica oil, while being agitated so as to uniformly heat it to a temperature of about 428° F. The oil should be brought to this temperature as rapidly as possible and maintained at that temperature for a period of from five to fifteen minutes, for example eleven minutes, after which it should be promptly cooled to about 212° F. The oil when polymerized to this extent is considerably slower drying than the original destearinated oil without substantial increase in viscosity but it has the property of producing tough elastic films.

A drier having particularly advantageous properties may be produced by mixing with the oil processed in the manner just described a further portion of destearinated oiticica oil which has been heated to a higher temperature, as for instance 572° F. and maintained at that temperature for a period of from three to eight minutes, for example five minutes. The oil when polymerized to this extent is slower drying than the oil polymerized at the lower temperature, but its viscosity and its ability to produce tough elastic films is increased.

The oil which has been cooked at about the temperature of 428° F. may be mixed with the oil which has been cooked at a temperature of about 572° F. in proportions such as to accomplish the desired properties as to drying ability and toughness and elasticity of film. For the purpose of general utility, a fifty-fifty mixture of these differently cooked oils may be employed.

By the addition of such destearinated oiticica oil to soy bean oil, an excellent paint vehicle is provided. The destearinated oiticica oil may be added to soy bean oil in the proportion of about 22 to 28% by volume, depending upon the conditions of application, 25% being suitable for general purposes. In the same manner the drying properties of other drying and semi-drying oil may be improved, as for instance, by the addition of from 10 to 11% of the destearinated oiticica oil to linseed oil, or about 18-22% of the oiticica oil to menhaden oil.

The addition of the destearinated oiticica oil to the drying or semi-drying oils, such as soy bean, linseed, menhaden, perilla, tung, etc., acts in a manner similar to the well known inorganic or metallic driers with, however, some very distinctive advantages in that the time of drying is substantially reduced, the drying properties of the basic oil are improved without darkening or discoloring; the resultant paint film is of longer life due to a greater elasticity and lack of extreme hardness of the film; it is water proof; and has the very distinct advantage that when such a paint is applied, old paint or previous coatings over which it is applied are dissolved, thus causing re-adherence of the oil film and this in turn prevents bubbles, cracking, and peeling of both the old and new paint coats.

Paint films in which the destearinated oiticica oil drier has been employed are resistant to washing with alkalies or strong soaps and more resistant to the action of cold turpentine and other solvents than paint films resulting from linseed oil with, or without, metallic driers. A very outstanding result of the destearinated oiticica oil as its ability when incorporated with soy bean oil to render that oil suitable for use as a paint vehicle without necessitating the use of special pigments which have heretofore been necessary. Moreover, the amount of the destearinated oiticica oil drier which is incorporated with other drying or semi-drying oils is, unlike the case of metallic driers, not a critical figure.

From the foregoing description it should be apparent that the present invention accomplishes its objects and that a process of treating oiticica oil is provided whereby the active drying constituent is recovered to be used for any desired purpose, particularly important among which is its use for drying other drying and semi-drying oils.

While in the foregoing description, reference has been made to certain details of procedure, as for instance, specific temperatures and times of treatment, it is not to be understood that the present invention is limited to those details because it is obvious that those skilled in the art will, from the teachings of these disclosures, be enabled to accomplish the results with slight variations of the details given. It is to be distinctly understood, therefore, that the invention is not limited to the specific details of procedure which have been hereinbefore given for the purpose of illustration, but that such modifications and the use of such individual features and subcombinations of features as do not depart from the spirit of this invention are, although not specifically described herein, contemplated by and within the scope of the appended claim.

Having thus described the invention, what is claimed is:

In the art of treating oiticica oil the process comprising, heating crude oiticica oil to the point of complete fusion and while the oil is maintained quiescent, cooling the oil to a temperature at which the steariform portion segregates, maintaining the said temperature until the steariform portion settles, treating the oil with hydrochloric acid, decanting the supernatant oleiform portion, and neutralizing the decanted oil.

JOHN P. STANCIL.